Figure 7:
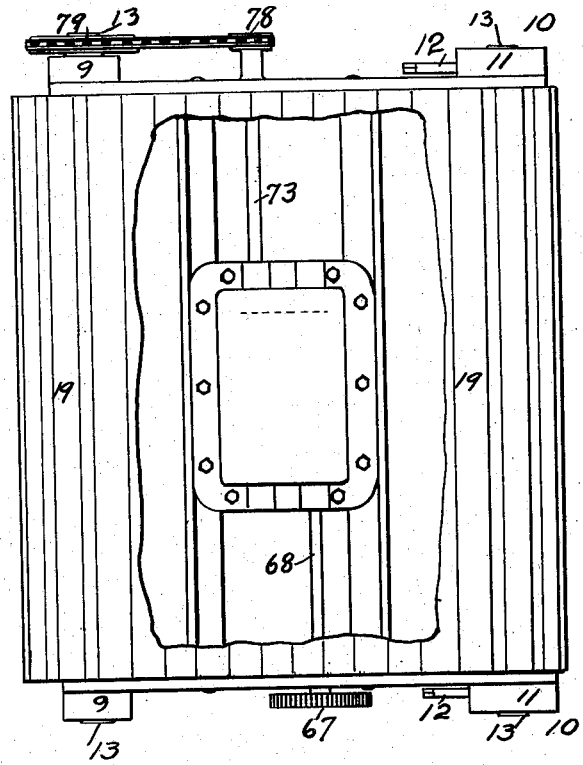

No. 867,003. PATENTED SEPT. 24, 1907.
H. W. BLAISDELL.
MANUAL SCRAPING MACHINE.
APPLICATION FILED NOV. 16, 1904.
5 SHEETS—SHEET 1.
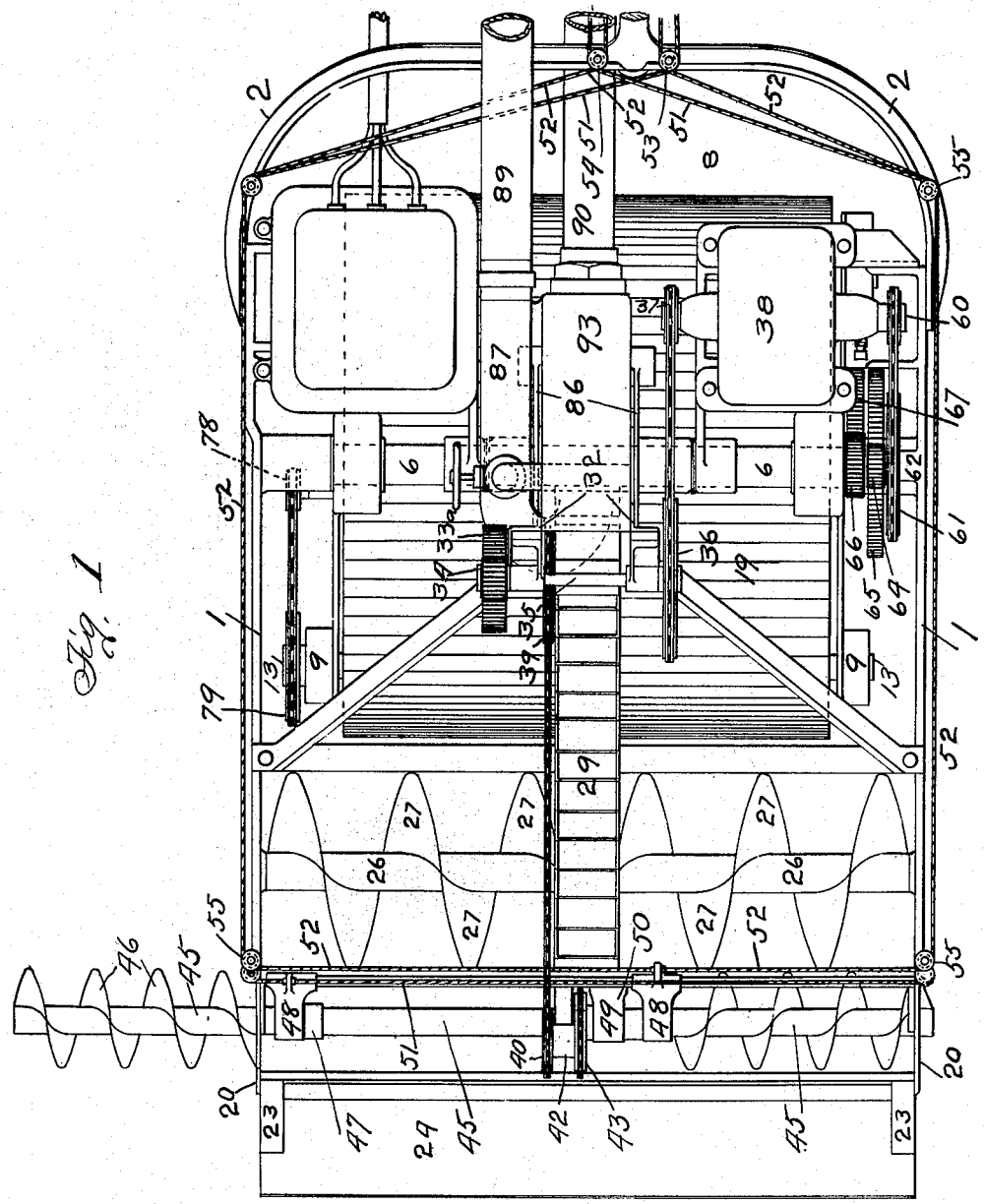
WITNESSES:
INVENTOR
Hiram W. Blaisdell
BY
Stephen Rogers
his ATTORNEY No. 867,003. PATENTED SEPT. 24, 1907.
H. W. BLAISDELL.
MANUAL SCRAPING MACHINE.
APPLICATION FILED NOV. 16, 1904.
5 SHEETS—SHEET 2.
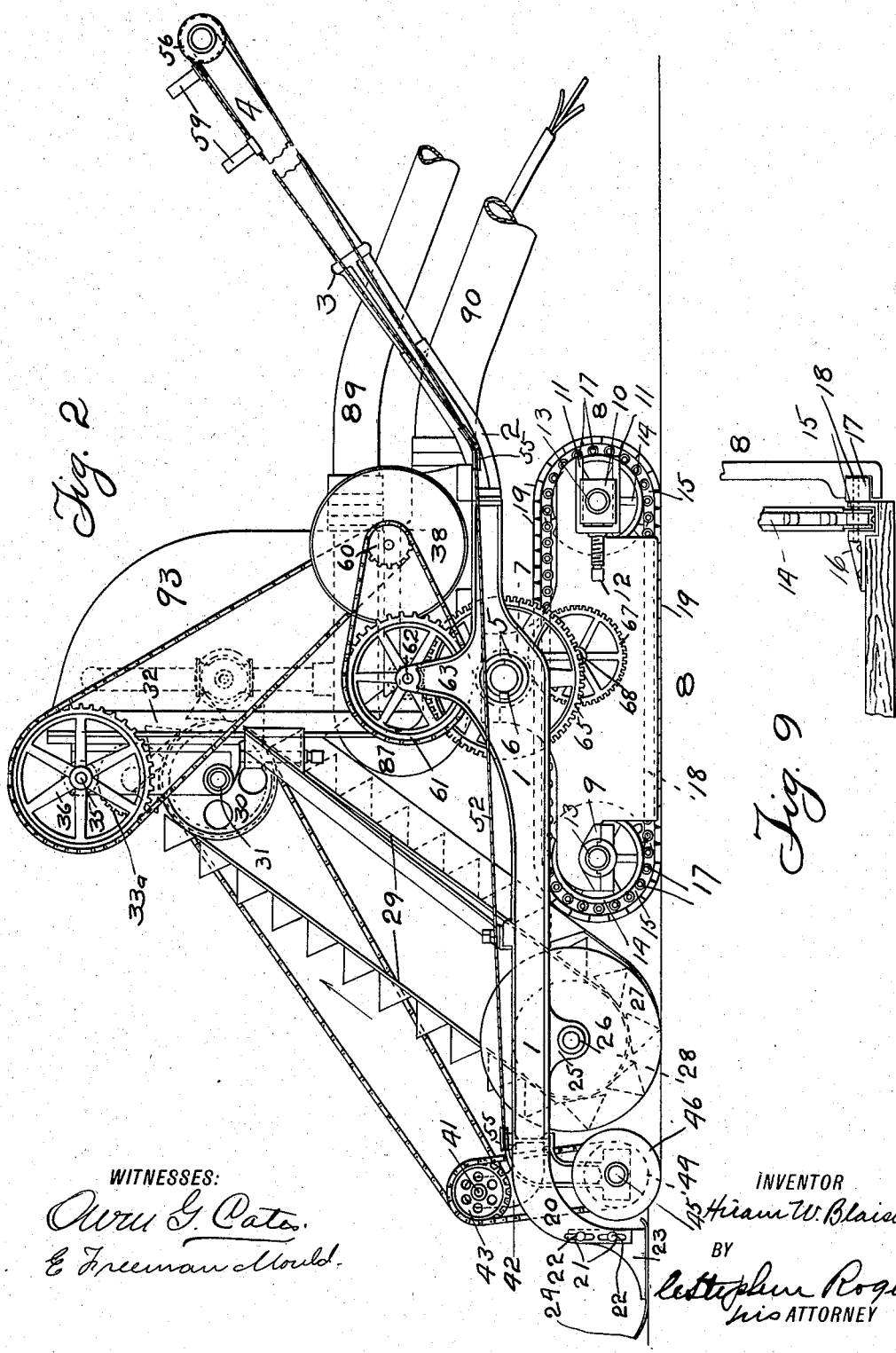

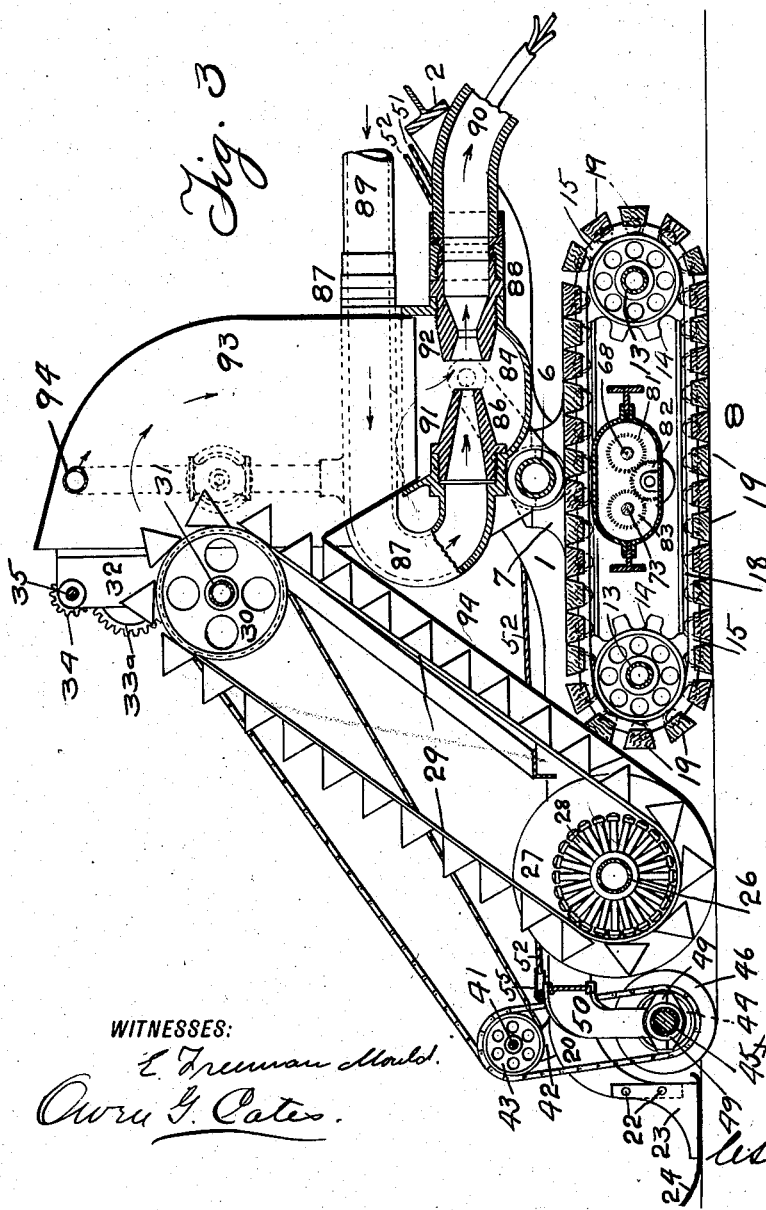

No. 867,003. PATENTED SEPT. 24, 1907.
H. W. BLAISDELL.
MANUAL SCRAPING MACHINE.
APPLICATION FILED NOV. 16, 1904.
5 SHEETS—SHEET 4.
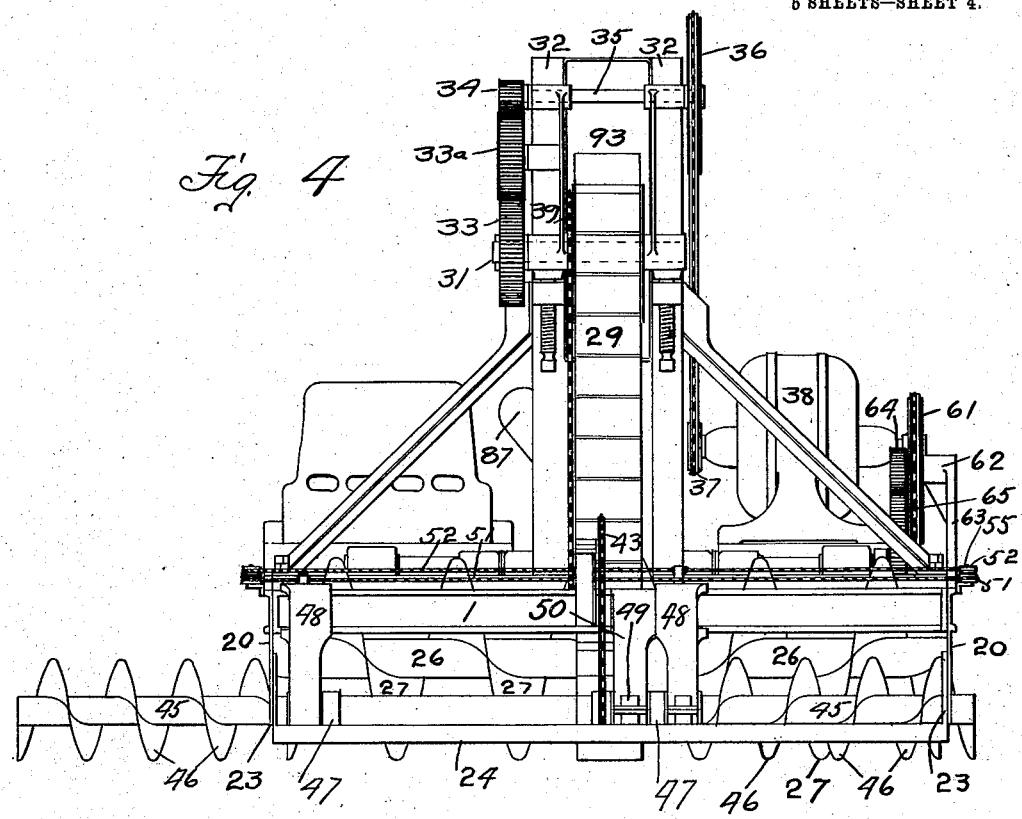
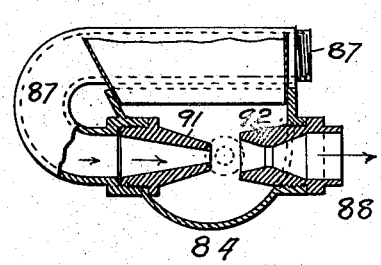
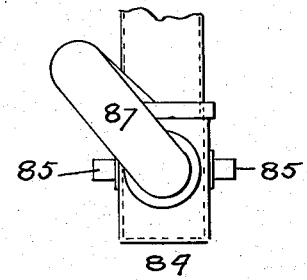
WITNESSES:
INVENTOR
Hiram W. Blaisdell
BY
Stephen Rogers
HIS ATTORNEY No. 867,003. PATENTED SEPT. 24, 1907.
H. W. BLAISDELL.
MANUAL SCRAPING MACHINE.
APPLICATION FILED NOV. 16, 1904.

5 SHEETS—SHEET 5.

WITNESSES:

INVENTOR
Hiram W. Blaisdell
BY
his ATTORNEY

UNITED STATES PATENT OFFICE.

HIRAM W. BLAISDELL, OF LOS ANGELES, CALIFORNIA.

MANUAL SCRAPING-MACHINE.

No. 867,003.  Specification of Letters Patent.  Patented Sept. 24, 1907.

Application filed November 16, 1904. Serial No. 233,001.

*To all whom it may concern:*

Be it known that I, HIRAM W. BLAISDELL, a citizen of the United States, residing at Los Angeles, in the county of Los Angeles and State of California, have invented certain new and useful Improvements in Manual Scraping-Machines; and I do hereby declare the following to be a full, clear, and exact description of the invention, such as will enable others skilled in the art to which it appertains to make and use the same.
This invention relates to means for operating upon filtration plants, or filter beds, and particularly to means constructed to operate upon partially or entirely covered filtration plants or slow sand filter beds; and some of the objects of the invention are to provide means of this general character which is simple and cheap in construction and operation and effective for the purpose intended.

Another object of the invention is to provide means constructed to travel on the surface of a filter adapted to remove the filtering material off or from filtration plants, or filter beds, to any desired depth; and to accomplish this operation mechanically in a rapid and efficient manner.

A further object of the invention is to provide surface traction means so constructed as to be capable of movement over the entire surface of the filter, and around or adjacent to the piers or supports for the roof of covered filtration plants, or filter beds, or other obstructions of the same.
It is also an object of the invention to provide means for the conveyance to, and discharge into, the machine of a fluid vehicle continuously throughout the entire movement or operation of the machine.

Furthermore an object of the invention is to provide means for conveying or discharging the foul filtering material or fluid from the surface operated upon, through the employment of a fluid vehicle.

Still another object of the invention is to provide simple and compact means for conducting the filtering material into the conveying element or fluid vehicle; and to provide means which is capable of manual operation in any direction.

Figure 8:
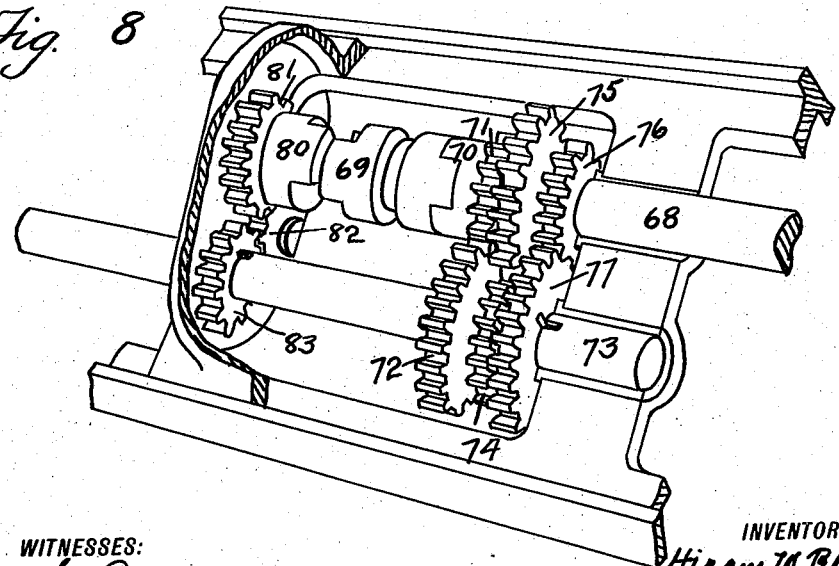

With these, and other, objects in view the invention consists essentially in the construction, combination and arrangement of parts substantially as more fully described in the following specification, and as illustrated in the accompanying drawings, forming part of this application, in which Figure 1 is a top plan view of the machine; Fig. 2 is a side elevational view of the same; Fig. 3 is a longitudinal central, sectional view of the machine; Fig. 4 is a front elevational view of the machine; Fig. 5 is an enlarged detail view, partly in section, of a form of ejector which may be employed; Fig. 6 is an enlarged detail end view of the same; Fig. 7 is a top plan view, partly broken away, of the supporting or traction portion; Fig. 8 is a perspective view, partly broken away, of a portion of the driving mechanism; and Fig. 9 is a detail view of a portion of the support.

Similar characters of reference designate corresponding parts throughout the several views.

This invention is particularly adapted for use with filtration plants, or filter beds, which are partially or entirely covered, or roofed over, and especially such plants or beds as are generally known as slow sand filters, although the invention can be used upon open filtration plants or filter beds, and for other purposes; however, in this application the invention will be described in connection with, or as operating upon, a slow sand filter bed. Before the machine is put into operation the water, upon the filter bed to be operated upon, should be drawn off partially or entirely to allow the operation of the machine. Whenever the yield of filtration plants, or filter beds, is diminished to such an extent or degree that enough water cannot be obtained therefrom, it is evident that the surface thereof has become clogged, and it then becomes necessary to "scrape" the filter bed; or remove the upper portion of the same; which, in the case of partially or entirely covered filters, is generally done by laborers, using shovels of extra width and long handles, who remove the surface portion, of the filter, varying from one-half to one inch in thickness, the filtering material so removed being thrown into piles a convenient distance apart. Whereupon the filtering material so piled up is shoveled into wheel-barrows and wheeled away to the place where the foul or contaminated material is to be washed or treated, thereby entailing a great expense of money and time, during which time the filter is rendered useless.

Referring to the drawings, and particularly to the construction illustrated in Figs. 1 to 4 thereof both inclusive, the reference character 1 designates a frame or casting, preferably rectangular in form, and formed on, or connected with, the rear end, 2 of the frame is a tubular extension of socket 3, to receive a handle 4 or other device, by means of which the machine may be controlled or directed during the operation thereof.

In the sides of the frame, near the rear end 2 thereof, are preferably formed bearings 5, Fig. 2, desirably for a tubular supporting or pivot shaft 6, which preferably passes through extensions or trunnions 7, on a supporting or carrier frame 8, desirably rectangular in form, and constructed to be movable within the main frame 1, upon the shaft 6, as a pivot or axis.

The supporting frame 8 is preferably provided at one end with fixed bearings 9, and at the other end with movable or adjustable bearings 10, mounted in slots or guides 11, in said end, and adjusted by means of a set screw 12, for the purpose of tightening the endless supporting device, hereinafter described.

Journaled in the bearings 9 and 10 are tubular or other shafts 13, whereupon are preferably mounted sets of toothed or sprocket wheels 14, Figs. 2, 3 and 6, constructed to engage and drive sprocket or other chains 15, Figs. 2, 3 and 9, desirably carrying rollers or sheaves, the shafts whereof are extended and journaled in brackets or other devices 16, and carry rollers 17, adapted to travel in channels 18, in the face of the supporting frame or side plates 8; and to the brackets 16 are secured slats or strips 19, substantially as illustrated particularly in Fig. 9 of the drawings.

By means of the construction just described a broad supporting surface or tread is formed for the machine, and one whereon the weight is equally and uniformly distributed over the entire surface of the supporting frame which is in contact with the crust or top of the filtering material; thus preventing the liability of breaking through the filter crust, and allowing the water to enter therebelow, or unduly compressing or packing the filtering material.

By reason of the supporting frame 8 and the main frame being both pivoted or movably mounted upon the shaft 6, the forward portion of the main frame can be elevated by depressing the handles, and the machine can be directed or operated in the desired direction, substantially as hereinafter more fully explained.

Formed on, or connected with, the forward corners of the main frame 1, are curved or depending arms 20, having slots 21, to receive adjusting bolts or devices 22, carried by the end plates or extensions 23, of a shoe or curved regulating plate 24, constructed to travel on the crust or surface of the filtering material in advance of the machine, and regulate the depth of the cut to be made thereby, as shown in Fig. 3 of the drawings.

Near the forward end of the main frame 1, and upon the side members thereof, are preferably formed depending extensions or bearings 25, Fig. 2, wherein is journaled a tubular or other shaft 26, preferably carrying a main conveyer 27, or right-and-left-hand endless screw; and intermediate of the ends of said shaft 26 is preferably secured the tail pulley, or toothed wheel 28, Fig. 3, of an endless-belt bucket elevator or other elevating device 29, also passing over a driving pulley 30, on a shaft 31, preferably journaled in an upright portion 32 of the main frame; and the shaft 31, desirably carries a gear wheel 33, meshing with an idler 33ᵃ driven by a pinion 34, on a shaft 35, having a sprocket wheel 36, chained to a small sprocket wheel 37, on the drive shaft of an electric motor or other driving apparatus 38, substantially as shown.

Upon the shaft 31, of the driving elevator-pulley 30, is secured a sprocket wheel 39, chained to a sprocket wheel 40, upon a shaft 41, journaled in vertical arms 42, formed on or connected with, the front portion of the main frame 1; and the shaft 41 preferably carries another sprocket wheel 43, chained to a similar wheel 44, splined upon the shaft 45, of auxiliary or wing conveyers, or right-and-left-hand endless screws 46. Screws 46 carry collars 47 to retain bearings 48, slidably mounted on the front of main frame 1, in position on the inner ends of screws 46, said bearings 48 forming sliding bearings for said screws and the outer ends of shaft 45, said shaft also being journaled in a fixed bearing 49, in the end of a depending arm or hanger 50, connected with the front of the main frame 1, substantially as shown. By reason of the construction just described one or other of the auxiliary conveyers or scrapers 46 may be extended or retracted according to necessity of the situation in which the machine may at the time be placed, as for instance when it is desired to scrape the surface around or adjacent to a supporting pier or other obstruction, which is out of the then line of travel of the machine.

The extension and retraction respectively of the auxiliary conveyers or scrapers 46, is preferably accomplished by means of two cables or ropes 51 and 52, Figs. 1, 2 and 4, and each of which is attached at both ends to one of the movable bearings 48, carrying the auxiliary conveyers 46, and the rope 51 passes from the bearing 48, of the extended conveyer 46, around the sheave 55, in the corner of the main frame adjacent thereto, thence around the sheave 55, at the rear of said frame, after which the rope 51 crosses beyond the handle 4 and around the sheave 53, Fig. 1, thence alongside of said handle to and around one of the sheaves 56, in the end of the handle, to and around the sheave 54, thence across to the sheave 55, at the other rear corner of the frame 1, along the side of said frame to and around the sheave 55, at the front corner of the frame and finally along the front thereof to the movable bearing 48, to which the other end of the rope 51 is attached. The other rope 52 is preferably attached at one end to the movable bearing 48, of the retracted auxiliary conveyer 46, passing from thence, along the front of the frame 1, to and around one of the sheaves, 55, at the adjacent front corner of the frame, thence along that side thereof to and around the sheave 55, at that rear corner of said frame; from whence the rope 51 crosses beyond the handle 4 to and around the sheave 54, and alongside of the handle, to and around one of the sheaves 56, at the end of said handle; and returns along the other side thereof to and around the sheave 53, crossing to the sheave 55, at the opposite rear corner of the frame 1, along the side thereof to and around the sheave 55, at the front corner of said frame and finally along the front of the same, to the movable bearing 48, of the said retracted conveyer 46 to which the other end of said rope is attached.

In order to facilitate the operation of the ropes 51 and 52, and effect the resultant alternate extension and retraction of the auxiliary conveyers 46, knobs or other devices 59 may be connected with said ropes or any other means may be employed, to actuate or reciprocate the said conveyers.

The machine is preferably propelled or progressed over the crust or surface of the filter, whereon the machine is operating by means of a sprocket wheel 60, chained to a large sprocket wheel 61, secured upon a shaft 62, journaled in an extension 63 of the main frame 1; and the shaft 62 preferably carries a pinion 64, meshing with a large gear wheel 65, on the pivot shaft 6, and on the hub of the wheel 65, is secured a pinion 66, engaging a large gear wheel 67, on the shaft 68, Figs. 1, 7 and 8, whereon is mounted a clutch 69, constructed to engage a clutch-member 70, on a pinion 71, loose on the shaft 68, and meshing with a loose gear 72, on a propelling shaft 73, carrying a pinion 74, engaging a loose gear 75, carrying a pinion 76, meshing with a gear 77, keyed to the shaft 75, which also carries a sprocket 78 chained to the sprocket 79, on one of the supporting shafts 13, carrying the sprocket wheels 14, whereover the endless supporting and traction device passes, substantially as before explained. By means of the reduction gearing just described, the machine may be propelled in a forward direction at a low rate of speed, thus permitting the full operation of the mechanism carried thereby during the travel of the machine.

The machine is desirably propelled in a rearward direction, or backed up, through the mediation of the clutch 69, engaging the clutch-member 80, on the pinion 81, upon the shaft 68, and meshing with an idler 82, engaging a pinion 83, keyed on the propelling shaft 73, carrying the sprocket 78, chained to the sprocket 79, on the supporting shaft 13, of the said supporting and traction device.

Referring particularly to the construction illustrated in Figs. 1, 3, 5 and 6 of the drawings, there is shown a form of discharging apparatus, which may be that of an ordinary hydraulic sand ejector, preferably embodying a main portion or casting 84, having trunnions 85, carried by arms or a yoke 86, mounted on the pivot shaft 6; and the main portion 84 is provided with an inlet and outlet connection 87 and 88 respectively attached to flexible inlet and outlet tubing or hose 89 and 90; and the inlet hose 89 is preferably connected with the source of fluid supply, and the fluid is preferably delivered to the ejector under pressure, as will be readily understood. The outlet hose 90 desirably communicates with the place of deposit of the foul or contaminated filtering material, or with a sand washer as may be found desirable; and inlet and outlet nozzles 91 and 92 are preferably attached to the ejector in the usual manner.

A receiver or hood 93, of any preferred construction, may be mounted in or upon the upright portion 32 of the frame 1, so as to communicate with the ejector 84; whereby the material is discharged into the receiver 93 by the elevator 29, and is directed by the former into the ejector 84; and a perforated pipe 94, may be mounted in the upper portion of the receiver, and may be connected with the inlet pipe 87, whereby the material discharged into the receiver may be washed down into the ejector and be conveyed from the machine.

The operation of the machine will be readily understood from the foregoing description, when taken in connection with the accompanying drawings, and the following explanation thereof. The machine being in operative position in or upon the filter to be operated upon, the motor 38 is started, thereby rotating the sprocket 60, chained to the sprocket 61, upon the shaft whereof is secured the pinion 64, meshing with the gear 65, upon the shaft of which is keyed the pinion 66, engaging the gear 67 upon the clutch shaft 68, carrying the clutch 69, and reduction gearing engaging similar gearing on propelling shaft 73, carrying the sprocket 78, chained to the sprocket 79, on one of the supporting shafts 13, carrying the sprocket wheels 14, actuating the said supporting and traction device, substantially as before explained. The starting of the electric motor 38 simultaneously imparts motion to the sprocket 37, chained to the sprocket 36, on the shaft 35, carrying the pinion 34, engaging the idler 33ª, meshing with the gear 33, on the shaft 31, carrying the driving pulley 30, of the elevator 29; and the tail pulley 28, of said elevator, imparts motion to the main conveyer shaft 26, carrying the main conveyer 27, as before explained. The sprocket 39, on the shaft 31, is chained to the sprocket 40, on the shaft 41, carrying the sprocket 43, chained to the sprocket 44, on the shaft 45, of the auxiliary conveyers 46; whereby both of the scrapers or conveyers are driven from the drive of the elevator. The scrapers or conveyers progress the material towards the middle of the machine, one or other of the auxiliary conveyers being extended, by means of the ropes 51 and 52, to reach that portion of the surface around or between the piers or obstructions, and the elevator takes up the material delivered to it, by the scrapers, and discharges the same into the receiver, where it is washed down by the spray or water jets from the perforated pipe 94, into the bottom of the receiver, to be expelled therefrom by the jet of fluid passing through the inlet hose, and escaping from the nozzle thereof, the incoming fluid carrying away with it the material in the bottom of the receiver, or more properly stated, the material in the ejector, which material is conveyed, through the hose 90 to the place of deposit.

It is not desired to limit or confine this generic invention to the specific construction, combination and arrangement of parts herein shown and described; and the right is reserved to make all such changes in, and modifications of, the same as come within the spirit and scope of the broad character of the invention.

Claims

1. A machine for operating upon filters comprising traction means adapted to travel on the surface of the filter bed, a carriage pivotally supported on said traction means, sand removal means mounted in said carriage and mechanism for operating the parts.

2. A machine for operating upon filters comprising flexible traction means adapted to travel on the surface of the filter bed, a carriage pivotally supported on said flexible traction means, sand removal means mounted in said carriage and mechanism for operating the parts.

3. A machine for removing material from filters comprising sand removal means, a main frame supporting the same, a secondary supporting frame removably connected therewith and adapted to rest on the surface of the filter bed so that the machine may be guided in any direction and means for operating the parts.

4. A machine for removing material from filters comprising sand removal means, a supporting frame therefor, a second frame movably connected therewith, a flexible traction device mounted in said second frame and adapted to rest on the surface of the filter bed and mechanism for operating the parts.

5. A machine for removing material from filters compricing sand removal means, a supporting frame therefor, a second frame pivotally connected therewith, flexible traction means mounted on said second frame and a motor for driving said flexible traction means and for operating the sand removal means.

6. A machine for operating upon filters comprising sand removing means, a main frame supporting the same, a secondary supporting frame movably connected therewith and adapted to rest on the surface of the filter bed and flexible traction means supported in said secondary frame and comprising an endless belt having transverse slats thereon the parts being so arranged that the machine may be guided in any direction.

7. A machine for removing material from filters comprising sand removing means, a supporting frame therefor, a second frame pivotally connected therewith, flexible traction means having a sectional contact surface mounted on said second frame and a motor for driving said traction means and for operating the sand removing means.

8. A machine for removing material from filters and the like provided with means for guiding the same in any direction at the will of the operator, means for collecting the material in a heap on the surface of the filter bed, a device for removing the collected material, apparatus for discharging the material so collected and removed and mechanism for operating the parts.

9. A machine for removing material from filters and the like provided with a traction portion adapted to rest upon the surface of the filter bed, means for guiding the machine in any direction at the will of the operator, means for collecting the material in a heap, a device for removing the material so collected into the machine, apparatus for discharging the material from the machine and mechanism for operating the parts.

10. A machine for removing material from filters and the like provided with means for guiding the same in any direction at the will of the operator, means for collecting the material in a heap on the surface of the filter bed, an elevator for the material collected by said means, a discharging device to remove from the machine the material raised by the elevator and mechanism for operating the parts.

11. A machine for operating upon filters and the like comprising a carriage adapted to travel on the surface of the filter, means for guiding the same in any direction at the will of the operator, main and auxiliary material collecting devices and mechanism for operating the parts.

12. A machine for operating upon filters and the like comprising a carriage adapted to travel on the surface of the filter, means for guiding the same in any direction at the will of the operator, main and auxiliary scrapers, means for removing the material collected by the scrapers and mechanism for operating the parts.

13. A machine for operating upon filters and the like comprising a carrier adapted to travel on the surface of the filter, means for guiding the same in any direction at the will of the operator, a main collecting device, and an extensible and retractable auxiliary collecting device and mechanism for operating the parts.

14. A machine for operating upon filters and the like comprising a carriage adapted to travel on the surface of the filter, means for guiding the same in any direction at the will of the operator, an extensible and retractable device for removing material from the surface whereon the machine travels and mechanism for operating the parts.

15. A machine for removing material from filters and the like provided with means for guiding the same in any direction at the will of the operator, means for collecting the material in a heap and for elevating the same, a discharging device, flexible inlet and outlet connections between said device and a source of fluid supply and discharge respectively and means for operating the parts.

16. A machine for removing material from filters and the like provided with an endless traction portion adapted to rest upon the surface of the filter bed, main and auxiliary collecting devices, means for removing the material collected by said devices, a discharging device having inlet and outlet connections and mechanism for operating the parts.

17. A machine for removing material from filters and the like provided with a main frame, a supporting frame having movable connection therewith, an endless traction device in said supporting frame adapted to rest on the surface of the filter bed, scraping devices, an elevator to remove the material collected by said device, a receiver for the material removed by the elevator, an ejector for effecting the discharge of the material from the receiver and mechanism for operating the parts.

18. A machine for removing material from filters and the like provided with a main frame, a supporting frame movably connected therewith traction means on said supporting frame adapted to rest on the surface of the filter bed, mechanism for effecting the forward and backward travel of the machine, a main scraper, an extensible and retractable auxiliary scraper, an elevator to remove the material collected by said scrapers, a receiver for the material so removed, an ejector to discharge the material from the receiver and mechanism for operating the parts.

19. A machine for removing material from filters and the like provided with means for guiding the same in any direction at the will of the operator, means for collecting the material in a heap and for elevating the same, an ejector, means for delivering the material thereto, means for discharging the material therefrom and means for operating the parts.

20. A machine for removing material from filters and the like provided with means for guiding the same in any direction at the will of the operator, means for collecting the material in a heap and for elevating the same, an hydraulic ejector, means for delivering the material thereto, means for discharging the material therefrom and means for operating the parts.

21. A machine for removing material from filters and the like provided with means for moving it upon the surface of the filter bed, means for collecting the material in a heap and for elevating the same, a hydraulic ejector, means for delivering the material thereto, means for discharging the material therefrom and means for operating the parts.

22. A machine constructed to remove material from a filter provided with adjustable means governed by the surface operated upon for controlling the depth of the material removed by the machine, apparatus for supplying water to the machine, a device for combining the material and water, means for disposing of the combined material and water, revolving means for supporting and progressing the machine on the surface of the filter and instrumentalities for operating the parts.

23. A machine constructed to remove material from a filter provided with a carriage adapted to travel on the surface of the filter, an ejector, means for supplying water thereto, a scraper, an elevator, apparatus for disposing of the material and water and instrumentalities for operating the parts.

In testimony whereof, I have signed my name to this specification in the presence of two subscribing witnesses at Los Angeles, county of Los Angeles, State of California this second day of November 1904.

HIRAM W. BLAISDELL.

Witnesses:
H. T. MORROW,
MIGNON FORD.